(12) United States Patent
Joshi et al.

(10) Patent No.: US 6,398,547 B1
(45) Date of Patent: Jun. 4, 2002

(54) OXY-FUEL COMBUSTION FIRING CONFIGURATIONS AND METHODS

(75) Inventors: Mahendra L. Joshi, Darien; Harley Borders, Lombard; Olivier Charon, Chicago, all of IL (US)

(73) Assignees: L'Air Liquide, Societe Anonyme pour l'Etude et l'Exploitation des Procedes Georges Claude (FR); American Air Liquide inc., Walnut Creek, CA (US)

( * ) Notice: Subject to any disclaimer, the term of this patent is extended or adjusted under 35 U.S.C. 154(b) by 0 days.

(21) Appl. No.: 09/542,055

(22) Filed: Mar. 31, 2000

(51) Int. Cl.[7] .............................. C21B 9/12; F27B 1/26
(52) U.S. Cl. ......................... 432/54; 432/213; 432/36; 431/12
(58) Field of Search .................. 432/36, 49, 54, 432/146, 175, 213; 431/1, 12; 137/77

(56) References Cited

U.S. PATENT DOCUMENTS 4,583,936 A * 4/1986 Krieger ........................ 431/1
6,203,314 B1 * 3/2001 Philippe et al. ............. 432/146

* cited by examiner

Primary Examiner—Gregory Wilson
(74) Attorney, Agent, or Firm—Burns, Doane, Swecker & Mathis, L.L.P.

(57) ABSTRACT

An oxy-combustion firing configuration, process, and apparatus can reduce the consumption of oxygen and fuel in an oxy-fuel combustion processes. Processes in accordance with the present invention include operation of an automated logic control device which controls an oscillating valve and controller. The valve and controller are used to oscillate the fuel and/or oxygen supplied to individual burners in a furnace. The oscillating parameters, such as frequency, amplitude, duty cycle, and phase difference between individual burners and their stoichiometry ratio are set to initiate preferable oxy-combustion in that furnace. Selective burner placement in the furnace enables the formation of deflagration zones which can provide very intense heating and complete combustion.

39 Claims, 5 Drawing Sheets

OXY-FUEL COMBUSTION FIRING CONFIGURATIONS AND METHODS

BACKGROUND OF THE INVENTION

1. Field of the Invention

The present invention relates to oxy-fuel combustion control, and more particularly to systems and methods for controlling oxy-fuel combustion in a furnace.

2. Brief Description of the Related Art

Oscillating Combustion (OC) to reduce NOx emissions has in the past been proposed. See Shamp, D., et al., "Improving Oxy-fuel Furnace Operating Efficiency: An Operator's Perspective", presented at the 59th Conference on Glass Problems, Ohio State University, Columbus, Ohio, Oct. 27–28, 1998; Wagner, J., et al., "Oscillating Combustion Increases Productivity and Decreases NOx emissions from industrial furnaces", 1998 American-Japanese Flame Research Committees International Symposium, Maui, Hi., Oct. 11–15, 1998; Charon, O., et al., "Pulsated $O_2$/Fuel flame as a new technique for low NOx emissions", Combustion Science and Tech., Vol. 90, pp.1-1 (1993); and U.S. Pat. Nos. 4,846,665 and 5,302,111.

The oscillating combustion theory (see, e.g., FIGS. 1 and 2 of U.S. Pat. No. 4,846,665) involves the creation of successive, $NO_x$, retarding, fuel-rich and fuel-lean zones within and along the length of the flame. This technique involves forced oscillation of the fuel flow rate to the burner. Heat is removed from the zones before they mix to reduce overall peak-flame temperature, thus reducing $NO_x$, formation.

Prior oscillating combustion technology relied on the oscillating valve, which was used to introduce the desired fuel-rich and fuel-lean oscillations in the flow. In the work by Shamp et al, above, a valve such as that described in U.S. Pat. No. 5,222,713, and available from CeramPhysics, Inc., was used.

The work of Shamp et al was conducted with the objective of reducing $NO_x$ emissions. However, the valve controller used in Shamp's work failed to provide a mechanism to provide a desired burner firing configuration, nor did it provide any mechanism for controlling or varying valve oscillating parameters such as oscillating frequency, amplitude, and duty cycle for individual burners.

There are few known combustion techniques or combustion modifications which can improve fuel efficiency in oxy-combustion furnaces. Most oxy-fuel combustion processes use standard nozzle mix oxy-fuel burners, which include separate passages for both fuel and oxygen. The fuel and oxidant generally mix at their respective nozzle ends to create mixing and a flame when ignited.

The flame is created using steady diffusion of fuel and oxygen all along the flame length. Most diffusion processes are not 100% efficient in mixing, and therefore excess oxygen (i.e., more than the theoretically correct amount) is needed. It has therefore become typical practice to supply about 5% to about 10% extra oxygen to the burner. Failure to supply excess oxygen in these amounts has in the past resulted in incomplete overall combustion and the production of undesirable CO and/or unburned hydrocarbons (HC).

It has been proposed to use flat flame oxy-burners, see U.S. Pat. Nos. 5,545,031 and 5,575,637, that can provide a larger flame surface area and thus improved radiation to the load. However, these flat-flame burners attained improvements in fuel efficiency over traditional cylindrical flame burners, e.g. U.S. Pat. No. 5,199,866 and U.S. Pat. No. 5,620,316, only on the order of 3% to 4%. Because the accuracy of fuel flow metering instruments is not great, these flat-flame fuel efficiency improvements have been marginal at best.

Other proposed techniques to reduce oxygen consumption in an oxy-fuel furnace include heat recovery using waste gases to preheat oxygen/fuel and/or the raw material. These techniques require a capital investment, and the cost of the equipment for conducting heat recovery must provide a reasonable payback in terms of energy savings in order for these techniques to be effective, a payback that may prove difficult to realize.

Yet another proposed method includes using oxy-air-fuel combustion. This involves a simple enriched-air combustion method where industrial oxygen consumption is less due to the utilization of ambient or preheated air (containing nitrogen). However, the fuel consumption and NOx emissions are much higher compared to 100% oxygen-fuel combustion depending upon the level of oxygen enrichment.

SUMMARY OF THE INVENTION

According to a first exemplary embodiment, a system useful for processing a material using heat comprises a furnace having an interior space, a sidewall, and an exhaust gas outlet, at least one burner positioned to direct a flame into the furnace interior space when fuel and an oxidant are supplied to the at least one burner, at least one valve in fluid communication with the at least one burner, the at least one valve having an open condition and a closed condition, the at least one valve passing fuel to the at least one burner when the at least one valve is in the open condition and when fluidly connected to a source of fuel, the at least one valve being movable between the open and closed conditions, and an automated logic control device operatively connected to the at least one valve to open and close the at least one valve, the automated logic control device including logic configured to control at least one of a frequency at which the at least one valve is opened and closed, the duty cycle of the at least one valve, and the flow rate amplitude of flow through the at least one valve.

According to a second exemplary embodiment, a process of controlling at least one burner in a furnace, the at least one burner receiving fuel from at least one valve and receiving oxidant from a source of oxidant comprises the steps of determining a valve duty cycle, a valve oscillation frequency, and a fuel flow amplitude through the valve, and oscillating the flow of fuel through the valve to the burner according to the duty cycle, oscillation frequency, and fuel flow amplitude.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DESCRIPTION OF THE PREFERRED EMBODIMENTS

Referring to the drawing figures, like reference numerals designate identical or corresponding elements throughout the several figures.

A novel oxy combustion firing configuration, process, and apparatus according to the present invention can reduce the consumption of oxygen and fuel in an oxy-fuel combustion processes. Processes in accordance with the present invention include operation of an automated logic control device which controls an oscillating valve and controller. The valve and controller are used to oscillate the fuel and/or oxygen supplied to individual burners in a furnace. The oscillating parameters, such as frequency, amplitude, duty cycle, and phase difference between individual burners and their stoichiometry (oxidant to fuel, or stoichiometric, ratio: SR) are set to initiate preferable oxy-combustion in the furnace.

By selecting the oxy-fuel burner placement, oscillating parameters, individual burner stoichiometry, and desired flue gas composition, the resulting combustion can offer savings on overall oxygen and fuel consumption, provide lower refractory temperatures (resulting in longer life), improved product quality, and lowered NOx emissions in the given furnace. According to the present invention, a preselected burner location in the furnace can create a special zone within the furnace having a cyclic deflagration process taking place at the frequency of the oscillating flame. This cyclic deflagration can result in vigorous mixing and evolution of heat, which in turn provides much higher flame speeds. The higher flame speeds, higher flammability limit, and temperatures in the oxy-fuel deflagration process can preheat the fuel and oxygen mixture, which thus combust with little or no excess oxidant needed in the overall combustion process. The oscillating flames also improve increased heat transfer to the load because of a higher load coverage area, and thus provide higher fuel efficiency. The automated logic control of an oscillating valve and a unique controller offers flexibility to optimize oxy-combustion inside furnace interiors.

Figure 1:
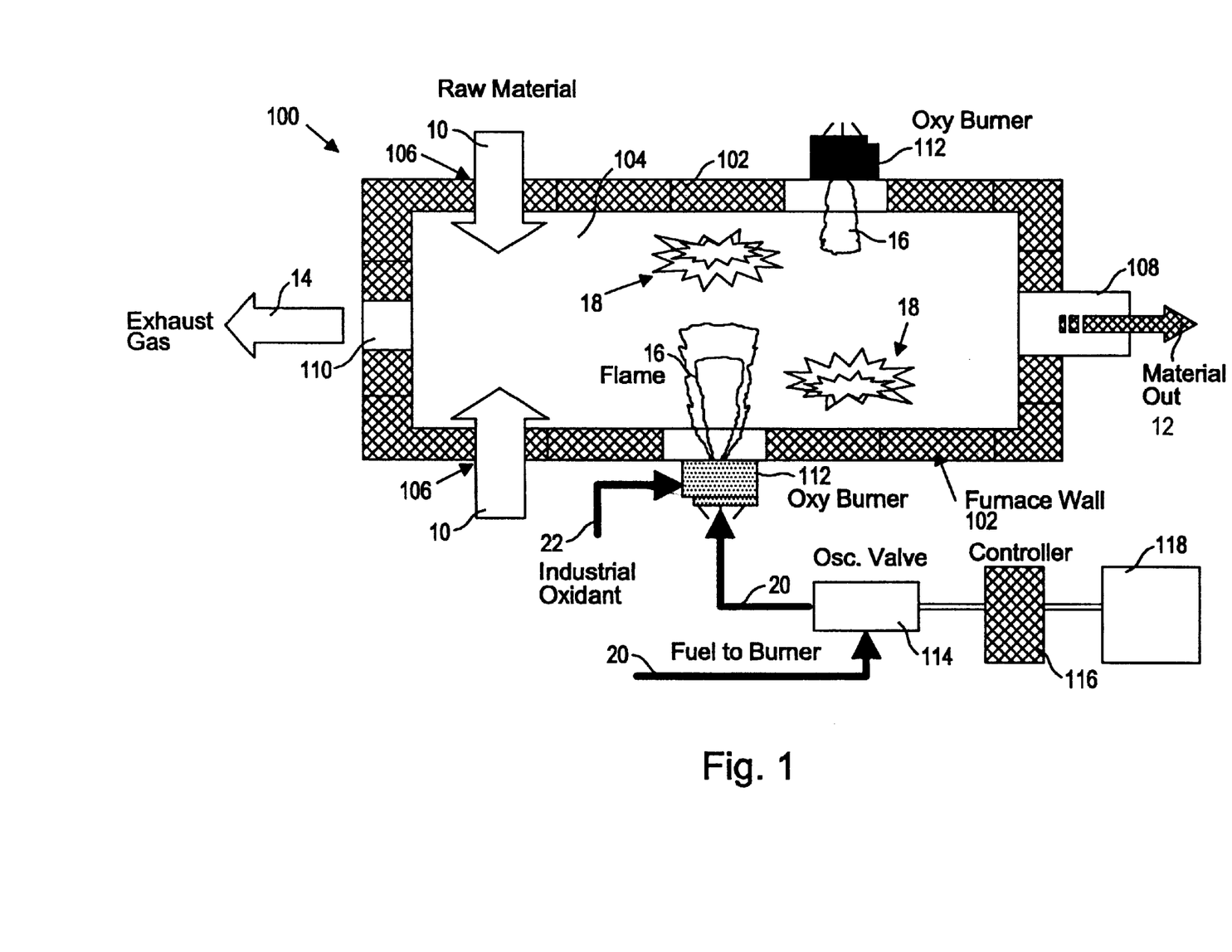
FIG. 1 illustrates a schematic top plan view of a first embodiment of a furnace in accordance with the present invention.

Turning now to the drawing figures, FIG. 1 schematically illustrates a first exemplary embodiment in accordance with the present invention. As illustrated in FIG. 1, a furnace 100 includes a furnace wall 102, an open interior space 104, entrances 106 which allow material 10 to be added or introduced into the furnace interior space, a material exit 108 which allows processed material 12 to exit or otherwise be removed from the furnace interior, and an exhaust flue or exit 110 which permits exhaust gases 14 to exit the furnace. As will be readily appreciated by one of ordinary skill in the art, the furnace 100 is provided with at least one, and preferably a plurality of burners 112 oriented to each direct a flame 16 into the interior of the furnace.

While FIG. 1 illustrates two burners 112, and that the burners are offset from one another, furnaces with more than two burners, as well as furnaces with burners that are directly opposed to one another, and combinations of directly opposed burner pairs and offset burner pairs, are also within the spirit and scope of the present invention. Positioning the burners offset from one another along the longitudinal direction of the furnace reduces or eliminates flame impingement during firing of the burners. The distance chosen between the centerlines of opposed burners will depend on overall furnace length, individual burner firing capacity, and overall number of burners, and preferably can vary between 3 feet to 10 feet.

FIG. 1 illustrates areas or zones 18 in the furnace interior 104 which are directly opposite the flame 16 of each burner. The zones 18 are areas in the furnace in which combustion of fuel and an oxidant can be achieved as a result of the intense temperature of the furnace interior and the presence of both unburned fuel and sufficient oxidant to permit combustion. This combustion can be termed deflagration, and therefore the zones 18 can be termed deflagration zones. This type of combustion can alternatively be termed autoignition or detonation. Whether the combustion is termed deflagration, autoignition, detonation, or any other term, it is characterized by very fast and nearly or entirely complete combustion of the available fuel and oxidant in the zone without the necessity of a flame or ignition source other than the latent temperature of the gases in the zone.

The furnace 100 also includes an automated logic control device 118 which controls the flow of fuel to each of the burners 112 of the furnace. The automated logic control device 118 is in control communication with a controller 116, which controls the operation of a valve 114 through which flows the fuel 20 to the burners 112. The valve 114 can be any suitable valve which can be oscillated between open, closed, and intermediate positions to control the flow of a fluid through the valve. Although many such valves are therefore usable in the present invention, one suitable valve is available from CeramPhysics, Inc., model #7, Solid State Proportioning Valve, which is rated for 500 kW (1.7 mm Btu/hr) nominal firing rate capacity. Optionally, each valve 114 can be provided with a pressure transducer which monitors the fuel pressure at the outlet of the valve and generates a data signal indicative of this pressure. Thus, the function of each valve can be monitored. Additionally, the data signal from the pressure transducer at each valve can be fed back to a central monitoring device, such as a multichannel oscilloscope, fed back to the automated logic control device 118 for the valves' operation (discussed in greater detail below) to provide for automatic feedback control, or both.

Thus, automated logic control device 118 controls the flow rate of the fuel 20 into the furnace 100. The automated logic control device 118 can also, simultaneously or alternatively, control the flow of the oxidant 22, e.g., industrial oxygen, oxygen-enriched air, oxygen-enriched (non-air) gas, or air, to each of the burners 112 within the spirit and scope of the present invention. The automated logic control device 118 therefore controls the SR for each of the burners 112 and for the furnace 100 as a whole. The preferred SR for deflagration and minimum emissions varies between about 1.85 and about 2.05. More preferably, the SR is about 1.95 for about 1000 Btu/cf HHV natural gas and 100% pure oxygen.

The automated logic control device 118 can be implemented in any one of numerous ways as will be readily appreciated by one of ordinary skill in the art. For example, the automated logic control device 118 can be a programmable logic controller (PLC), in analog, digital, or hybrid analog/digital form, a general purpose computer including logic implemented in software stored on a memory device, or any other implementation as will be readily apparent to one of ordinary skill in the art. Thus, while an exemplary embodiment will be described below, it is merely an example of the automated logic control device 118 and is described to illustrate certain features of the present invention.

The oscillating parameters (such as flow amplitude, frequency, and duty cycle, discussed in greater detail below) of each valve 112 and flue gas composition are adjusted such that the several zones 18 for deflagration type oxy-fuel combustion are created. In the zones 18, a cyclic deflagration process is obtained. In a deflagration zone 18, a pocket of fuel (injected during a fuel-rich portion of the burner's oscillating cycle) meets the pocket of excess oxygen in the next cycle to create a dynamic flame front. This deflagration process very efficiently consumes all or nearly all available molecules of oxygen. The process is very rapid due to high flame speeds, the presence of preheated fuel and preheated oxygen volumes, a higher temperature furnace environment (typically 2600° F. (1427° C.) to 3000° F. (1649° C.)), and generates good mixing due to pressure pulses created by the oscillating flames.

The deflagration process is efficient and does not require excess oxygen molecules, as is required in most steady diffusion flames. The heat is nearly instantly released from a rapid burst due to the deflagration. Combustion efficiency can reach complete combustion using the theoretically correct amount of oxygen. Such complete combustion is not possible with standard combustion processes using typical nozzle mix burners. Furthermore, burner placement according to the present invention can reduce the quantity of industrial oxidant, e.g. oxygen, supplied to the furnace.

As illustrated in FIG. 1, the burners 112 are staggered to allow enough space or a zone 18 for accumulation of fuel and oxygen volumes during consecutive oscillating cycles (fuel-rich and fuel-lean cycles). The high temperature furnace, such as a glass melting furnace, provides nearly ideal conditions for rapid combustion or deflagration depending on the residence time (oscillating frequency) and actual volumes of fuel and oxygen present in these zones. As described below with reference to FIG. 2, the burners' oscillating parameters, such as fuel flow amplitude (flow volume) and frequency (residence time for accumulation of gases) are selected to enhance this deflagration process.

As described below with reference to FIG. 2, the oscillating parameters for any individual burner, such as the frequency of oscillations, flow amplitude, duty cycle, and individual burner stoichiometry are selected to tailor the operation of the deflagration zone. A carefully optimized deflagration zone can provide complete combustion with minimum oxygen use in the process. At the same time, the heat release from deflagration will improve product quality and furnace productivity. While other measures of the establishment of efficient deflagration zones 18 in a furnace are also within the scope of the present invention, minimizing overall CO production and maximizing $O_2$ in the exhaust flue gases is one measure of having established deflagration zones which are efficiently combusting fuel and oxidant in the furnace.

Processes and systems in accordance with present invention also enable oxygen staging in the furnace by varying the duty cycle and frequency of the burners, enables close refractory temperature control by varying duty cycle, permits control over various flame conditions, such as whether the flame is reducing or oxidizing, by duty cycle variation. Other advances include enabling various flame lengths by fuel flow amplitude control, variable heating control by frequency variation, enhanced flame stability (in the case of oxidant-enriched air combustion) by frequency control. Additionally, the present invention provides a simple human machine interface (HMI) to change various parameters for efficient furnace operation in real time.

Figure 2:
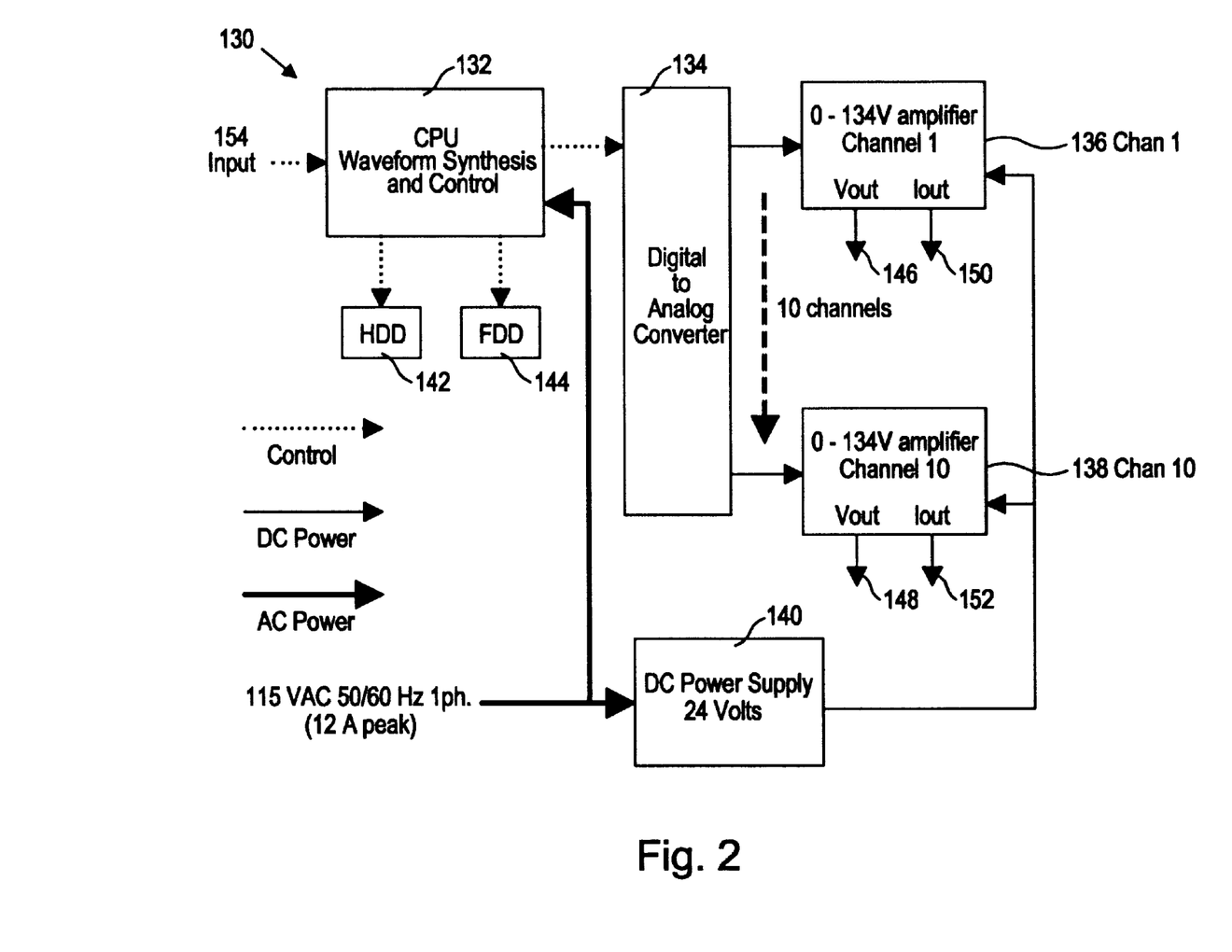
FIG. 2 schematically illustrates a first embodiment of a controller in accordance with the present invention.

FIG. 2 diagrammatically illustrates an exemplary embodiment of system 130 which can be used as automated logic control device 118. System 130 includes a general purpose computer 132 including memory storage devices 142 (HDD) and 144 (FDD), and may further include additional memory storage devices such as CD-ROM, flash memory, and the like, as will be readily appreciated by one of ordinary skill in the art. A digital-to-analog converter (DAC) 134 is in communication with computer 132 to receive a control signal. The DAC 134 is in communication with at least one amplifier per burner 112. Suitable amplifiers include, but are certainly not limited to, an Ultravolt model #1/8 A24P125. In the embodiment illustrated in FIG. 2, only two amplifiers 136, 138 are illustrated of the ten amplifiers of the present embodiment, one amplifier for each burner. Each amplifier 136, 138 includes analog high voltage and current outputs 146, 148, 150, 152 which are in communication with each valve controller 116. The computer 132 preferably includes an input channel 154, such as a serial, parallel, EEE-488 bus, or other input channel, which enables the computer to receive data or logical instructions from a source other than its own memory devices.

One exemplary implementation of system 130 includes an input port, e.g. a RS-232 serial port input, to the system. The computer 132 includes a logical set of instructions, e.g., a software application, which maps a function of each burner's oscillating variables, such as oscillating frequency, amplitude, duty cycle, and phase to a digital representation of a fuel flow rate waveform. The computer 132 then communicates the digital waveform signals to the DAC 134. The DAC 134 converts the digital waveform signal, which embodies the input oscillating parameters, to equivalent analog (voltage or current) waveform signals. As the DAC 134 preferably includes plural output channels, one for each of the burners in the furnace, the analog fuel flow waveform for each burner is output to the respective amplifier. In turn, the amplifiers 136, 138 generate high voltage or current waveforms according to the digital from computer 132.

Figure 3:
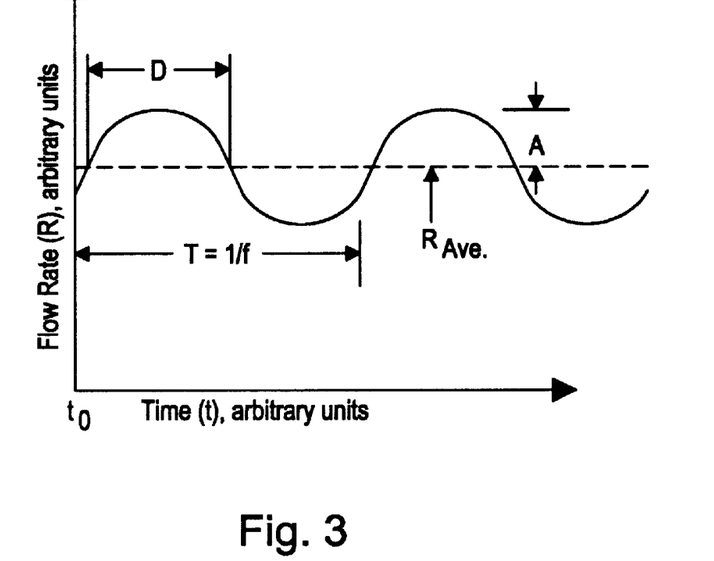
FIG. 3 diagrammically illustrates a waveform of flow rate versus time in accordance with the present invention.

FIG. 3 diagrammatically illustrates a graph or chart of the flow rate of fuel (R) through a burner versus time (t), both variables having arbitrary units, which will aid in an understanding of burner control in accordance with the present invention. According to the present invention, the automated logic control device 118 controls at least one burner of the furnace 110, and preferably all of the burners, so that the flow rate of fuel through the burner varies with time, e.g., is oscillatory. While FIG. 3 illustrates an oscillatory functional relationship between fuel flow rate and time which is not purely sinusoidal, it is also within the scope of the present invention to provide for purely sinusoidal, square wave, and sawtooth oscillation of the fuel flow rate. More preferably, a square wave oscillation is utilized in the present invention.

As illustrated in FIG. 3, the relationship between R and t can be characterized in part with several variables:

$R_{AVE}$=Average fuel flow rate per cycle

D=duty cycle, the percent time per cycle that R>$R_{AVE}$, compared to the entire cycle T=time for one cycle=1/f f=cycle frequency=1/T A=maximum flow rate amplitude, in percent, above $R_{AVE}$ Θ=phase shift of any particular burner's cycle from that of another burner D can be expressed as a percentage of the total time T by (D/T)·100

Θ can be expressed in either degrees or radians, or converted to time in seconds, and is determined by first selecting a burner of all of the burners as a master burner, and then determining the difference in time between corresponding points on the R v. t graph or function for each burner.

As discussed briefly above, D for the exemplary graph in FIG. 3 is greater than 50%, indicating a fuel-rich burner cycle. Stated differently, for more than 50% of the time per cycle that the burner is operating, the burner is operated in a fuel-rich, oxidant-lean mode, while for less than 50% of the time per cycle, the burner is operated in a fuel-lean, oxidant-rich mode. Thus, D>50% also means that the burner will produce a local reducing atmosphere, and D<50% means that the burner will produce a local oxidizing atmosphere. By adjusting the duty cycle D, the flow rate amplitude A, and the frequency f (or characteristic time T), any particular burner can be operated over a wide range of stoichiometric ratios, and thus the presence of excess fuel, oxidant, and both in the furnace 100 can be controlled.

Preferably, D is between about 30% and about 70%, A is between about 30% and about 80%, f is between about 0.2 Hz and about 2 Hz, and Θ is about 180 degrees. Furthermore, it is preferable that SR is between about 1.95 and about 2.05.

The logic provided in the system 118 enables a user to enter a set of burner operation variables using a standard input device, e.g., a keyboard, pointing device (e.g., mouse), touch-screen, or the like (in general, the HMI), upon which the logic will operate to translate into a fuel flow waveform for a particular burner or set of burners. For example, the user input can be as simple as a command line from a keyboard, or remotely through an input port to the computer 132, which conforms to a predetermined syntax, that the logic can interpret. By way of example and not of limitation, the logic can be configured to allow a user to program individual channels (burners), display the current operational parameters a channel (burner), and display the most recent voltage and current data from any programmed channels. The logic can also further optionally be provided with system tests and error checking on startup and during normal operation, as will be readily apparent to one of ordinary skill in the art.

Also by way of example and not of limitation, a simple input to the logic in computer 132 can include values for: the channel/burner the operation of which is to be changed; the maximum fuel flow rate; the minimum fuel flow rate; the duty cycle; the frequency; whether or not the particular burner is to be synchronized with another burner; the number or channel of the burner with which the particular burner is to be synchronized; and a value of how much in or out of phase the particular burner is to be with respect to the master burner. As will be readily apparent to one of ordinary skill in the art, additional operational parameters may be controlled by user input by routine configuration of the logic resident in computer 132, such as resetting all of the channels, including 'all-off' and 'all-on' commands, the generation of fault codes for component malfunction, and the like. According to one preferred embodiment, the computer 132 is a Pentium®-based, AT-platform personal computer including a standard keyboard and monitor which includes a logical set of software instructions, contained on a memory of the computer, coded to implement the foregoing functions.

Table 1 presents data obtained from a comparative test using a glass furnace equipped with an oscillating combustion system in accordance with the present invention. The burner placement was staggered as illustrated in FIG. 1. Ten oxy-burners were adjusted to oscillate as described above. Table 1 presents the oscillating parameters used, fuel and oxygen consumption, electrical energy input, and furnace emissions, as well as NOx reduction compared to standard, non-oscillating operation of the oxy-burners.

TABLE 1

Non-oscillatory combustion vs. oscillatory combustion data for a glass melter

| PARAMETRIC TESTS | Non-Oscillating Operation | Oscillating Combustion |
|---|---|---|
| Pull Rate (tons/day) | {nominal} | {nominal} |
| Cullet (%) | 7 | 7 |
| Elec. Boost (KWh) | 600 | 600 |
| Fuel Use (scfh NG) | 20,000 | 19,000 |
| Oxygen to Fuel Ratio | 2.10 | 2.00 |
| Oxygen Use (scfh) | 42,000 | 38,000 |
| Furnace Pressure (iwc) | 0.03 | 0.03 |
| Air Infiltration (scfh) | 11,830 | 12,300 |
| Oscillating Parameters | | |
| Oscillating Frequency (f) (Hz) | — | 0.8 |
| Osciilating Amplitude (A) (%) | — | 50 |
| Oscillating Duty Cycle (D) (%) | — | 50 |
| Avg. Emissions (dry) | | |
| $O_2$ (%) | 5.0 | 3.6 |
| $CO_2$ (%) | 70.5 | 70.1 |
| CO (ppmv in flue) | <100 | <100 |
| CO (ppmv, in stack) | <5 | <5 |
| NOx (ppmv) | 1,225 | 717 |
| NOx (lbs/ton of glass) | 1.0 | 0.55 |
| NOx Reduction (%) | — | 45 |

As detailed in Table 1, a 10% reduction in oxygen supply and 5% decrease in fuel consumption was achieved by the oscillating combustion of the present invention. For a glass furnace operator, this represents a tremendous saving in operating costs. In addition, these oxygen and fuel savings were accomplished with more than 45% NOx reduction compared to the baseline, non-oscillating NOx emissions for the furnace.

Figure 4:
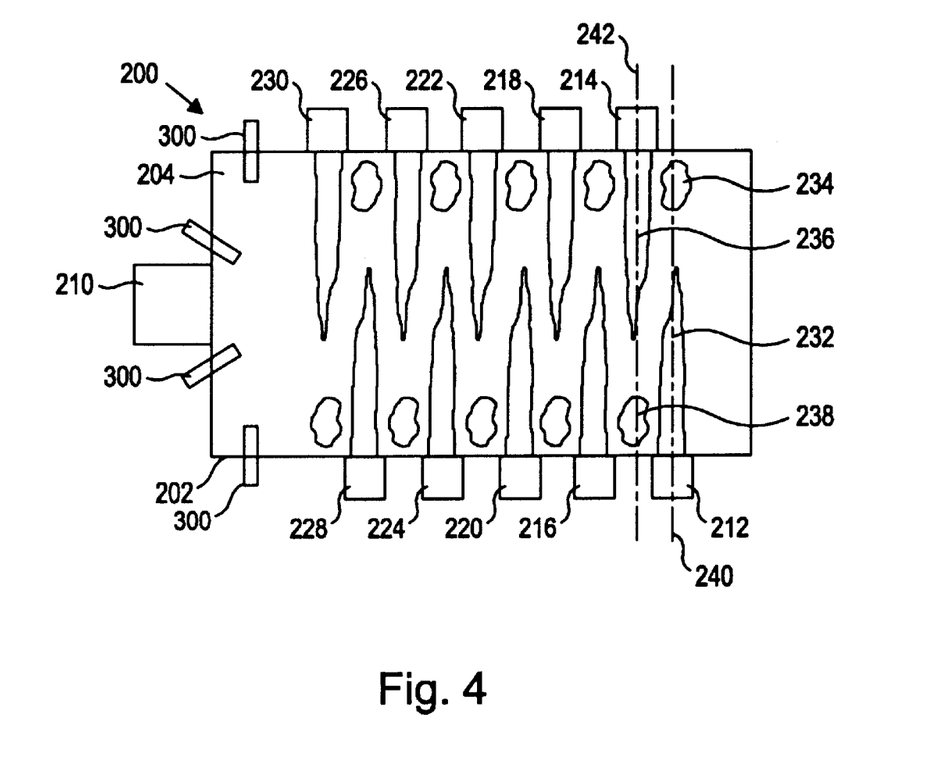
FIG. 4 illustrates a schematic top plan view of another embodiment of a furnace in accordance with the present invention.

FIG. 4 illustrates an exemplary embodiment of a furnace 200 including ten burners arranged in opposed pairs: 212, 214; 216, 218; 220, 222; 224, 226; and 228, 230. As described above, each pair of burners can be aligned in one of two ways: offset, and directly opposed. In the embodiment illustrated in FIG. 4, the burner pairs are offset from each other, that is, the centerline axis 240 of burner 212 is offset longitudinally from the centerline axis 242 of burner 214. The centerline axes of the remaining pairs of burners are similarly offset. As described above with reference to FIG. 1, offsetting the burners of a pair of burners readily accommodates the formation and presence of deflagration zones, such as the deflagration zones 234, 238, because the flames 232, 236 of the burners 212, 214, respectively, are offset and therefore will not disrupt the opposing burner's zone.

Figure 5:
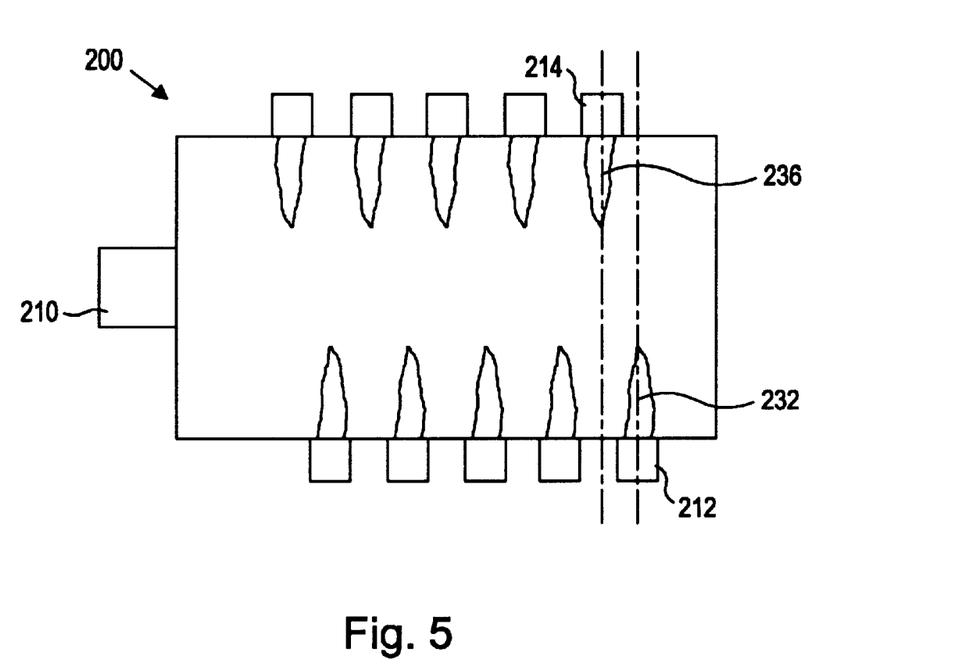
FIG. 5 illustrates a schematic top plan view of the furnace illustrated in FIG. 4 when operated in accordance with the present invention.

FIGS. 4 and 5 illustrate how a furnace, and more particularly the burner array of the furnace, can be operated in accordance with one embodiment of the present invention. As illustrated in FIGS. 4 and 5, all of the burners are operated with $\Theta=0$, that is, all of the respective burner fuel flow rate cycles are in-phase, each reaching its maximum $R_{MAX}$ at the same time as the other burners (see FIG. 4), and each reaching its minimum $R_{MIN}$ at the same time (see FIG. 5). Further optionally, the burner fuel flow rate cycles can be the same, that is, they can all have the same waveform. Thus, the load of material in the furnace can be cyclically exposed to different heat transfer rates, which can beneficially result in improved furnace performance.

Figure 6:
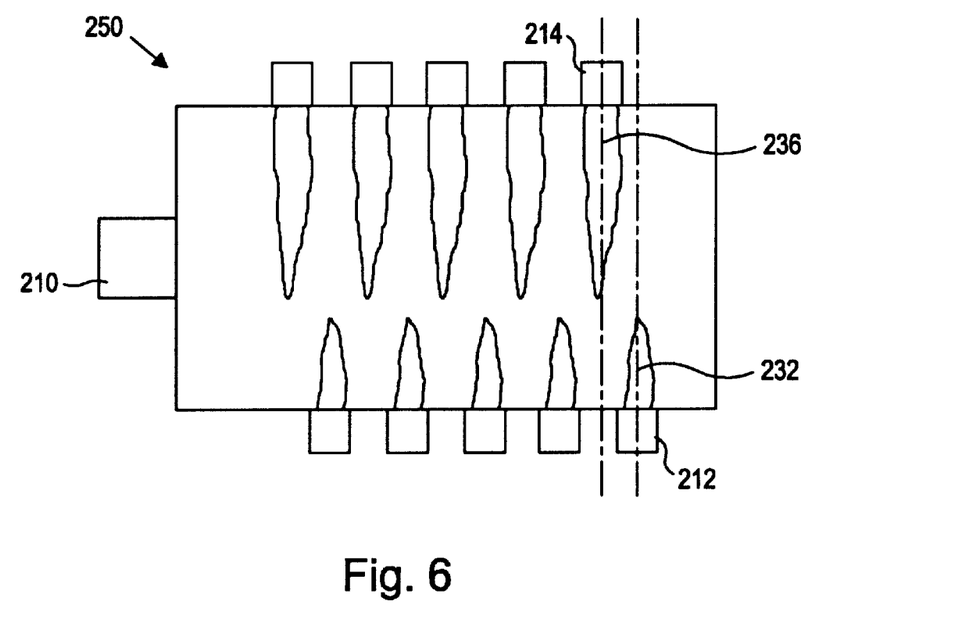
FIG. 6 illustrates a schematic top plan view of yet another embodiment of a furnace in accordance with the present invention.
Figure 7:
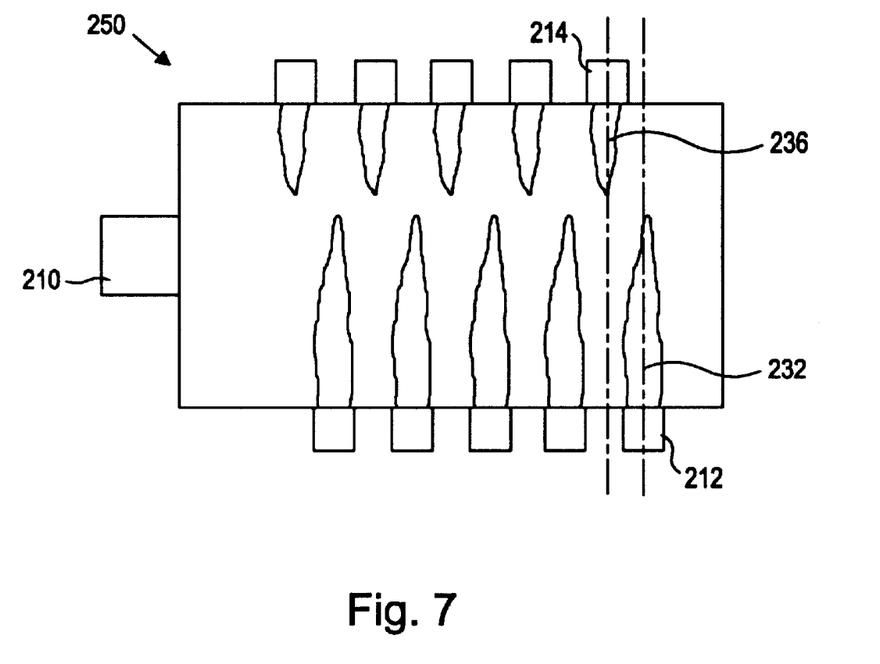
FIG. 7 illustrates a schematic top plan view of the furnace illustrated in FIG. 6 when operated in accordance with the present invention.

FIGS. 6 and 7 illustrate a furnace 250 in accordance with the present invention. The furnace 250 is otherwise identical to furnace 200, with the exception that the burners on one side of the furnace are controlled and operated 180 degrees out-of-phase with the opposing burners. Thus, assigning burner 212 as a master burner, burner 214 and those on the same side of the furnace each are operated with $\Theta=180$ degrees, while burner 212 and those on the same side of the furnace each are operated with $\Theta=0$ degrees. Thus, the flames 232, 236 of the burners 212, 214 oscillate back-and-forth laterally across the width of the furnace in a synchronized fashion.

Figure 8:
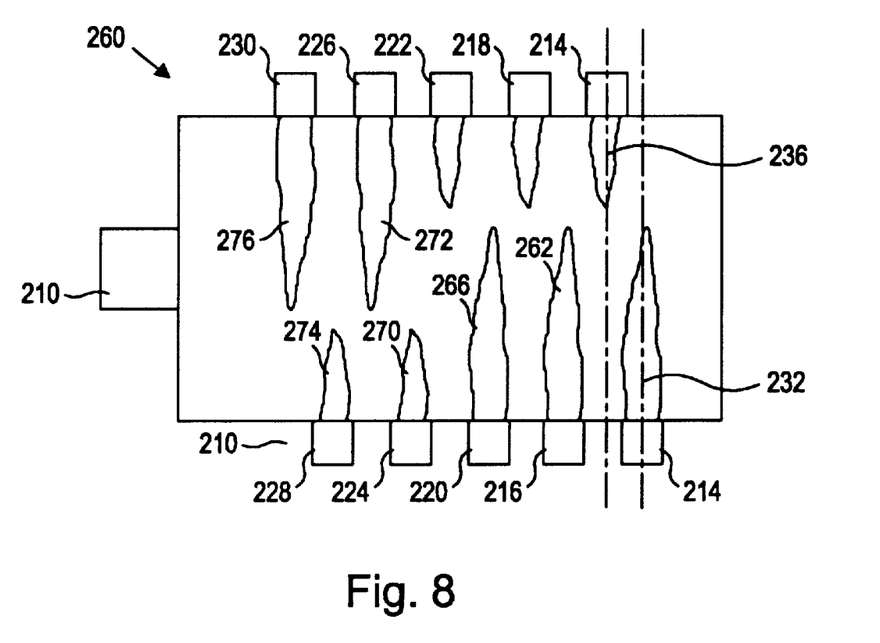
FIG. 8 illustrates a schematic top plan view of yet another embodiment of a furnace in accordance with the present invention.

FIG. 8 illustrates yet another embodiment in accordance with the present invention. A furnace 260 is otherwise identical to the furnaces 200, 250, with the exception that the burners are controlled and operated in a different manner. As illustrated in FIG. 8, the burners 212, 216, 220 are operated in synch with the burners 214, 218, 222, that is, the burners 214, 218, 222 are 180 degrees out of phase with the burners 212, 216, 220, similar to the operation of the burners of furnace 250. The burners 224, 228 are operated out of phase with the burners 226, 230, and also out of phase with the burners 212, 216, 220. Thus, different longitudinal portions of the furnace 260 are heated in different ways, which can have beneficial effects on product quality.

The advantages of in-phase or out-of-phase firing of one group of burners versus another group of burners include optimizing the heat release to the load, minimizing refractory hot-spots, creating ideal conditions for destabilizing certain type of foam over glass, reducing optimizing emissions of NOx and CO, and reducing overall oxygen and fuel consumption.

One further exemplary embodiment of the present invention relates to the use of oscillatory combustion in a glass furnace. In a glass furnace, a pulsating reducing flame over the glass surface can significantly affect the chemical composition of sulfate-type glass. Foam is a natural product resulting from the decomposition of the glass batch during the melting process. The rapid decay of the foam layer is desirable to the glass maker, as the foam has very poor thermal conductivity and by reducing the foam thickness a greater percentage of the heat can be transferred to the glass melt.

The formation of foam is primarily temperature dependent. Excessive localized heating of the glass surface, for example from a burner, can accelerate foam formation. The pulsating flame of the present invention, having lower flame temperature and a larger flame coverage area compared to a conventional flame, results in lower temperature signature on the glass surface. This lower temperature results is less foam formation. Furthermore, accelerated destablization of the foam bubble occurs in reducing atmospheres. Laimbock, P. R., "Foaming of Glass Melts", Eindhoven, Technisches Universiteit Eindhoven, 1998, pp. 41–51. However, glass made in reducing atmospheres can be prone to unwanted color changes. By pulsing the flame in accordance with the present invention, a localized and momentary reducing atmosphere can be established over the glass surface, to enhance the bubble destabilization process yet not affect the glass color since the overall combustion stoichiometry in the furnace as a whole can still remain oxidizing.

Another exemplary embodiment of the present invention relates to the use of oscillatory combustion in a steel reheat furnace. According to the present invention, the heating zone in a steel reheat furnace can be operated with a group of burners out-of-phase with each other. The burners in the heating zone can fire at a much higher firing rate with oscillations to provide effective heat transfer to a relatively cold load. This configuration also allows increased load coverage (due to longer flame lengths and deflagration heat transfer) and a more homogeneous heat profile to the load than with non-oscillatory burner heating. Due to the enhanced heat transfer, the steel products can spend less time in the heating portion of the reheat furnace. The burners in the downstream soak zone can have a group of burners operating on relatively steady firing (very long or no oscillations) at a much lower firing rate to maintain a constant (final product) temperature profile in the load.

Scale formation on the steel billets in such reheat furnaces is an unwanted consequence of the reheating process. The scale evolution on the steel surface follows a parabolic law:

$$dX^2_{ox}/dt=2k_{ox}$$

The rate constant $k_{ox}$ is given by:

$$\text{Log}_{10}(1.877k_{ox})=-8868/T\ (K)+0.977$$

Sheasby, J. S., et al., "Scale growth on steels at 1200 C: Rationale of reate and morphology", Metal Science, Vol. 18, pp. 127–136, March 1984.

As scale formation is strongly a function of temperature, the faster the product reaches the process temperature the less scale that would form. By pulsing the burners in the heating zone in accordance with the present invention, improved heat transfer can be generated, thus resulting in a product with less scale formation.

In addition, the oscillating flames with a reducing stoichiometry can effect the scale formation process in a steel reheat furnace. The partial pressure of the combustion atmosphere contributes to the chemical reactions of the scale formation. Ormerod, R. C., et al., "Effects of process variables on scale formation in steel reheating", The Canadian Journal of Chemical Engineering, Vol. 75, pp. 401–413 (1997). The primary chemical species involved are oxygen, carbon dioxide, and water. Although the reaction paths and kinetics vary for each species, all of these species contribute to the overall scale formation process. As described above, pulsing a burner in accordance with the present invention can achieve complete combustion near or at stoichiometric conditions. Compared to conventional continuous (non-oscillatory) firing burner operation at 5% excess oxygen, an oscillating burner of the present invention can operate at a reduced oxidation state, e.g., <2% excess oxygen. The reducing stoichiometric atmosphere generated by the oscillating flame and lower overall flame temperature can reduce the scale formation rate, and thus the scale thickness. As will be readily appreciated by one of ordinary skill in the art, better steel quality and less waste due to the presence of a scale layer over the product are advantages attributable to the present invention.

According to yet another embodiment of the present invention, the furnace 100, 200, 250, and 260 can be provided with oxidant lances 300, which are preferably directed toward the centerline of the furnace at, for example, 30° to the longitudinal axis of the furnace. Lances 300 fluidly communicate a source of an oxidant, e.g., oxygen, oxygen-enriched air, oxygen-enriched (non-air) gas, and/or air (not illustrated), with the interior space of the furnace. Lances 300 can be used to operate any of the foregoing furnaces with staged, oscillating combustion.

Oscillating combustion in accordance with the present invention can optionally further be used with a staged combustion process to reduce NOx emissions. According to the present invention, there are at least two embodiments which include staged combustion in an oxy furnace utilizing oscillating combustion: duty cycle variation, and oxidant lancing.

According to the present invention, the duty cycle of the burners in a furnace can be varied. More particularly, at least one, and preferably an array of oxy-burners, preferably positioned away from the furnace exhaust, are operated at a higher duty cycle (e.g., D>50%) or under fuel-rich conditions (SR<2.00) and the remaining oxy-burner or array of oxy-burners, preferably near the furnace exhaust, can be operated at a lower duty cycle (e.g., D<50%). The high-duty-cycle or fuel-rich oxy-burners can reduce NOx because of lower flame temperatures conditions. While the fuel-rich oxy-burners can produce excessive CO emissions, the low-duty-cycle or fuel-lean oxy-burners near the exhaust location can provide excess oxygen, due to their lower duty cycle, which can burn out most or all of the CO produced by the high-duty-cycle burners.

Overall NOx reduction from a furnace in accordance with the present invention can be as high 60% without significant CO production. As will be readily appreciated by one of ordinary skill in the art, the number of burners operating under lower duty cycle and number of burners operating under higher duty cycle can be selected according to the particular needs of the furnace, including the individual firing rate and NOx reduction needed. By either manually adjusting the stoichiometric ratio of the burners, or preferably using an automated logic control device, such as device 118, to control the operation of oxy-burners, based on flue gas composition measurements, furnace performance and efficiency can be improved over prior furnaces. Again by way of example and not of limitation, a combination of an array of burners (including at least one burner) operating at 70% duty cycle and an array of burners (including at least one burner) operating at 30% duty cycle can provide improved performance.

In addition to the foregoing embodiments of the present invention, one or more oxidant lances 300 can be incorporated into a furnace of the present invention. As described briefly above, at least one oxy-burner is operated at a higher duty cycle (D>50% or SR<2.00) and at least one oxidant lance is positioned adjacent the furnace exhaust. The injection of an oxidant into the furnace interior can burn out most of, and preferably all of, the CO produced by the oxy-burners. Thus, the present invention also can reduce NOx despite lower flame temperatures under fuel-rich conditions.

As illustrated in FIG. 4, the oxidant injection lances 300 are positioned near the furnace exhaust to combust any CO, unburned fuel, or other hydrocarbon produced during fuel-rich oxy-burner firing. While any suitable oxidant flow rate into the furnace is within the scope of the present invention, the oxidant flow rates can be between about 2000 scfh to about 30,000 scfh depending on the size of the oxy furnace.

The amount of oxygen injected through lances 300, as a percent of overall furnace stoichiometry, can be between 2% to 15%. An amount close to 5% of overall stoichiometry is optimum for the oxidant injection. The overall SR for non-oscillating oxy-fuel combustion is typically between about 2.10 to about 2.15, typically resulting in from about 5% to about 7% excess oxygen in the flue.

In contrast, the overall oxygen consumption for an oxy-fuel glass melting furnace in accordance with the present invention can be between about 5,000 scfh (5 tons/day) and about 300,000 scfh (300 tons/day), depending on the size of the furnace (between 10 tons/day to 600 tons/day of glass). The oxidant lances 300 preferably inject between about 5% and about 10% of the total oxidant used in the furnace as staged combustion oxygen. Oxidant lances 300 can also be incorporated into a furnace in which fewer than all of the oxy-burners are operated with oscillating combustion. This would result in some NOx reduction and some CO production (due to higher duty cycle or fuel-rich operation).

The oscillating parameters, such as burner oscillation frequency, flow amplitude, duty cycle, and phase difference can be determined based on individual burner firing rate, individual burner SR, and the furnace volume. The measurement of furnace temperature(s), flue gas composition measurement, and the product produced by a furnace, including furnaces in accordance with the present invention, are well understood by one of ordinary skill in the art and will not be detailed herein. By operating a furnace in accordance with the present invention with a model load or an actual load, evaluating the foregoing furnace outputs, and modifying the operation of the burner arrays, preferably with an automated logic control device 118 in accordance with the present invention, and feeding back the furnace outputs to further tune the operation thereof, one or more of the benefits of the present invention can be achieved.

From the foregoing example, results of which are detailed in Table 1, a glass furnace was operated in accordance with aspects of the present invention, under the following conditions:

Frequency of oscillation (f): 0.5 Hz

Flow Amplitude (A): 90% (deviation of A above $R_{AVE}$, as percentage of $R_{MAX}$–$R_{MIN}$))

Duty cycle (D): 50%

Synchronization: opposite burners out-of-phase (see FIGS. 6 and 7)

The exhaust gas composition (dry) was measured for the following constituents:

Excess $0_2$ (%)

CO (ppm, vol.)

NOx (ppm, vol.)

$CO_2$ (%)

Approximately 3% excess oxygen and less than 100 ppm (vol.) CO were maintained for both baseline (non-oscillating) and oscillating combustion.

As detailed in Table 1, a furnace in accordance with the present invention, when compared with non-oscillating combustion performance, achieved fuel savings (4%) and oxygen savings (12%). Furthermore, the furnace operated at 50° F. (28° C.) cooler refractory crown temperature, at a hot spot location, and without any reduction in glass bottom temperatures.

In the foregoing example, the oscillating flames also helped in destabilizing foam over the glass surface. The foam is generally present in various thickness (½" to 6") due to certain chemicals reactions involving molten glass ingredients and evolution of gases such as $SO_2$, $H_2O$, $CO_2$, and oxygen from the glass bath composition. The foam is undesirable in glass melting since it shields thermal energy from the burner flame and refractory crown from penetrating into the glass layer. It was observed during operation of the furnace in the foregoing example that by selecting the oscillating parameters in Table 1, the fuel rich pulses, including higher CO concentration injected by the oxy-burners, actually reduced this foam layer. Without being limited to a particular theory, it is believed that localized reducing conditions created by the oscillating pulses made the foam layer unstable and thus reduced the overall foam thickness on the glass.

In summary, the present invention has several aspects. By offsetting oxy-fuel burners in the furnace, a number of deflagration zones opposite to the oscillating oxy-fuel burners can be maintained. Burner oscillating parameters, such as flow amplitude, frequency, duty cycle, and phase differences between opposite side and/or neighboring burners, can be selected and dynamically controlled to maximize the effects of the cyclic deflagration process. The benefits can include fuel savings, oxygen savings, lower refractory temperature, improved furnace productivity, and improved product quality.

The furnace operating parameters, such as stoichiometric ratio and flue gas composition, are also varied to obtain minimum emissions (including CO, $CO_2$, SOx, and NOx) from the furnace. The $CO_2$ reduction is due to the lower fuel and oxygen consumption resulting from the deflagration process. The lower NOx and SOx emissions can be attributed to lower flame temperatures in the oscillating flame and lower fuel consumption.

The present invention also relates to novel firing configurations (in-phase, out-of-phase, group phasing, global phasing) implemented based on the type of furnace such as glass melter, metal heat treatment furnace, steel reheat furnace, etc., and geometrical size of the furnace. Automated logic control synchronization can further be utilized for the furnace operation. Oxygen staging in the furnace by the duty cycle variation can also be incorporated, where the advantages of staged combustion can be obtained by changing the duty cycle. By selectively operating some burners on a higher duty cycle for fuel rich combustion and some or the remaining burners on a lower duty cycle, low NOx emissions and low flame temperature, and therefore lower refractory temperature, can be obtained.

Refractory temperature control by duty cycle variation, generating various flame conditions (reducing, oxidizing) by duty cycle variation, flame length control by fuel flow amplitude, duty cycle, and frequency control, convective heating control by frequency variation, enhanced flame stability by frequency control, are also aspects of the present invention. Providing an automated, or automatable, logic based controller and human machine interface to change various parameters for efficient furnace operation is also an aspect of the present invention, as well as changing the frequency, amplitude, phasing, and duty cycle alternatively between burner pairs to control local furnace atmosphere over the furnace load from reducing to oxidizing. Furthermore, the stoichiometric ratio of opposed pairs of burner can be periodically alternated by controlling the start and end fuel flow rates and then reversing the flow rates, which can establish local zones of either oxidizing or reducing conditions with overall balanced furnace stoichiometry.

While the invention has been described in detail with reference to exemplary embodiments thereof, it will be apparent to one skilled in the art that various changes can be made, and equivalents employed, without departing from the scope of the invention. All of the aforementioned patents and literature documents are incorporated by reference herein in each of their entireties.

What is claimed is:

1. A system useful for processing a material using heat, comprising:
   a furnace having an interior space, a sidewall, and an exhaust gas outlet;
   at least one burner positioned to direct a flame into the furnace interior space when fuel and an oxidant are supplied to the at least one burner;
   at least one valve in fluid communication with the at least one burner, the at least one valve having an open condition and a closed condition, the at least one valve passing fuel to the at least one burner when the at least one valve is in the open condition and when fluidly connected to a source of fuel, the at least one valve being movable between the open and closed conditions; and
   an automated logic control device operatively connected to the at least one valve to open and close the at least one valve, the automated logic control device including logic configured to control at least one of a frequency at which the at least one valve is opened and closed, the duty cycle of the at least one valve, and the flow rate amplitude of flow through the at least one valve.

2. A system in accordance with claim 1, wherein the at least one burner comprises two burners, and the at least one valve comprises two valves in fluid communication with the two burners.

3. A system in accordance with claim 1, wherein the furnace includes an exhaust fuel in fluid communication with the furnace interior space.

4. A system in accordance with claim 1, wherein the automated logic control device comprises
   a general purpose computer having a memory, the logic residing in the memory;
   a multichannel digital-to-analog converter in communication with the computer;
   at least one amplifier in communication with the digital-to-analog converter; and
   at least one valve controller, each of the at least one valve controller being in communication with one of the at least one valve.

5. A system in accordance with claim 4, wherein the computer includes an input, and the logic is configured to receive data from the input and convert the data to a digitized representation of a waveform for each one of the at least one valve.

6. A system in accordance with claim 5, wherein the computer and the logic are configured to communicate each digitized representation of a waveform to the digital-to-analog converter, the digital-to-analog converter for converting each waveform from a digital to an analog form.

7. A system in accordance with claim 6, wherein the digital-to-analog converter communicates each analog waveform to a separate amplifier.

8. A system in accordance with claim 1, wherein the logic is configured to control a phase difference of a digitized form of a waveform from a predetermined value.

9. A system in accordance with claim 1, wherein the automated logic control device comprises a programmable logic controller.

10. A system in accordance with claim 1, wherein the furnace sidewall comprises first and second longitudinally extending portions which face each other, the at least one burner comprises a first burner array and a second burner array, the first burner array positioned along the first longitudinally extending portion of the furnace sidewall, the second burner array positioned along the second longitudinally extending portion of the furnace sidewall.

11. A system in accordance with claim 10, wherein the first burner array includes a burner having a first center axis and the second burner array includes a burner having a second center axis, the first center axis and the second center axis being longitudinally offset.

12. A system in accordance with claim 10, wherein the first burner array includes a plurality of equally spaced apart burners, and the second burner array includes a plurality of equally spaced apart burners.

13. A system in accordance with claim 1, further comprising at least one oxidant lance in communication with the furnace interior space and positioned adjacent to the exhaust gas outlet.

14. A system in accordance with claim 13, further comprising:
a source of oxidant in fluid communication with the at least one oxidant lance, the oxidant in the source of oxidant selected from the group consisting of industrial oxygen, oxygen-enriched air, oxygen-enriched non-air gas, and air.

15. A system in accordance with claim 1, further comprising:
a source of oxidant in fluid communication with the at least one burner, the oxidant in the source of oxidant selected from the group consisting of industrial oxygen, oxygen-enriched air, oxygen-enriched non-air gas, and air.

16. A process of controlling at least one burner in a furnace, the at least one burner receiving fuel from at least one valve and receiving oxidant from a source of oxidant, comprising the steps of:
determining a valve duty cycle, a valve oscillation frequency, and a fuel flow amplitude through the valve; and
oscillating the flow of fuel through the valve to the burner according to the duty cycle, oscillation frequency, and fuel flow amplitude.

17. A process in accordance with claim 16, further comprising determining a valve oscillation phase shift from a predetermined value, and wherein the step of oscillating the flow of fuel through the at least one valve further comprises oscillating according to the valve oscillation phase shift.

18. A process in accordance with claim 16, wherein said determining step comprises forming a digital representation of a waveform from the valve duty cycle, valve oscillation frequency, and fuel flow amplitude.

19. A process in accordance with claim 18, wherein said forming step further comprises forming a digital representation of a waveform from the waveform phase shift.

20. A process in accordance with claim 18, further comprising converting the digital representation of a waveform to an analog waveform.

21. A process in accordance with claim 16, further comprising:
amplifying the analog waveform; and
controlling the valve with the amplified analog waveform.

22. A process in accordance with claim 16, wherein the at least one burner comprises a first burner array positioned on a first longitudinally extending portion of the furnace, and a second burner array positioned on a second longitudinally extending portion of the furnace facing the first portion, each burner array including at least one burner, each burner of each array in communication with a fuel flow valve, and wherein the determining step comprises determining, for each valve, a valve duty cycle, a valve oscillation frequency, and a fuel flow amplitude through the valve, and wherein the oscillating step comprises oscillating the flow of fuel through each valve to each burner according to the duty cycle, oscillation frequency, and fuel flow amplitude for that burner.

23. A process in accordance with claim 22, further comprising determining a valve oscillation phase shift from a predetermined value for each valve, and wherein the step of oscillating the flow of fuel through each valve further comprises oscillating according to the valve oscillation phase shift of each valve.

24. A process in accordance with claim 22, wherein the oscillating step comprises oscillating each valve for the burners in the second burner array with the same phase shift.

25. A process in accordance with claim 22, wherein the oscillating step comprises oscillating each valve for the burners in the first burner array with the same phase shift, oscillating each valve for the burners in the second burner array with the same phase shift, and wherein the first phase shift and the second phase shift are different.

26. A process in accordance with claim 22, wherein the oscillating step comprises oscillating each valve for the burners in the first burner array at a phase shift of 180 degrees from each valve for the burners in the second burner array.

27. A process in accordance with claim 22, wherein the first array of burners includes first and second subsets of burners, and the second array of burners includes third and fourth subsets of burners, and the oscillating step comprises oscillating the first and third subsets in phase, and oscillating the second and fourth subsets in phase.

28. A process in accordance with claim 27, wherein the oscillating step comprises oscillating the first and third subsets out of phase with the second and fourth subsets.

29. A process in accordance with claim 22, wherein the oscillating step comprises oscillating each valve for the burners in the first burner array with the same phase shift.

30. A process in accordance with claim 16, further comprising injecting an oxidant into the furnace interior away from the at least one burner.

31. A method in accordance with claim 30, wherein the oxidant is selected from the group consisting of industrial oxygen, oxygen-enriched air, oxygen-enriched non-air gas, and air.

32. A process in accordance with claim 16, wherein the oscillating step comprises oscillating the flow of fuel in a fuel-rich stoichiometric ratio.

33. A process in accordance with claim 16, further comprising burning off excess carbon monoxide in the furnace prior to exiting the furnace.

34. A process in accordance with claim 16, wherein the at least one burner comprises first and second burners, and wherein the oscillating step comprises oscillating the flow of fuel to the first burner with a duty cycle greater than 50%, and oscillating the flow of fuel to the second burner with a duty cycle less than 50%.

35. A process in accordance with claim 16, wherein the at least one burner comprises first and second burners, and wherein the oscillating step comprises oscillating the flow of fuel to the first burner with a fuel-rich stoichiometric ratio, and oscillating the flow of fuel to the second burner with fuel-lean stoichiometric ratio.

36. A process in accordance with claim 35, wherein the first and second burners are positioned longitudinally offset along a length of the furnace.

37. A process in accordance with claim 16, wherein the oscillating step comprises oscillating the flow of fuel to produce a reducing atmosphere in a portion of the furnace.

38. A process in accordance with claim 37, wherein the oscillating step comprises oscillating the flow of fuel to produce an oxidizing atmosphere in a portion of the furnace.

39. A method in accordance with claim 16, wherein the oxidant is selected from the group consisting industrial oxygen, oxygen-enriched air, oxygen-enriched non-air gas, and air.

* * * * *